(12) United States Patent
Vishlitzky et al.

(10) Patent No.: US 6,842,843 B1
(45) Date of Patent: Jan. 11, 2005

(54) DIGITAL DATA STORAGE SUBSYSTEM INCLUDING ARRANGEMENT FOR INCREASING CACHE MEMORY ADDRESSABILITY

(75) Inventors: Natan Vishlitzky, Brookline, MA (US); Haim Kopylovitz, Brookline, MA (US); Eli Shagam, Brookline, MA (US)

(73) Assignee: EMC Corporation, Hopkinton, MA (US)

( * ) Notice: Subject to any disclaimer, the term of this patent is extended or adjusted under 35 U.S.C. 154(b) by 318 days.

(21) Appl. No.: 09/896,485

(22) Filed: Jun. 29, 2001

(51) Int. Cl.[7] ............................................. G06F 12/10
(52) U.S. Cl. ........................... 711/209; 711/5; 711/203
(58) Field of Search ................................ 711/2, 5, 202, 711/203, 206, 208, 209

(56) References Cited

U.S. PATENT DOCUMENTS 6,295,584 B1 * 9/2001 DeSota et al. .............. 711/147
6,604,184 B2 * 8/2003 Zahir et al. ................. 711/207

* cited by examiner

*Primary Examiner*—Gary Portka
(74) *Attorney, Agent, or Firm*—Scott A. Ouellette; Penelope S. Wilson; John M. Gunther (57) ABSTRACT

A memory manager for use in connection with a memory comprises a memory access request receiver module, an address translation module and a memory access operation control module. The memory access request receiver module is configured to receive an access request requesting an access operation in connection with the memory, the access request including an address. The address translation module is configured to, (i) if the access request requests an access operation in connection with one of a plurality of sections of the memory, provide the address in the access request as an absolute address identifying at least one storage location in the one section; and (ii) if the access request requests an access operation in connection with another of said sections, generate an absolute address from the address provided in the access request, the address in the access request including a segment identifier and an offset, the address translation module being configured to process the segment identifier and offset to generate an absolute address identifying at least one storage location in the other of said sections. The memory access operation control module is configured to perform an access operation in connection with the memory using the absolute address generated by the address translation module.

15 Claims, 3 Drawing Sheets

DIGITAL DATA STORAGE SUBSYSTEM INCLUDING ARRANGEMENT FOR INCREASING CACHE MEMORY ADDRESSABILITY

FIELD OF THE INVENTION

The invention relates generally to the field of digital computer systems and more particularly to a digital data storage subsystem including an arrangement for increasing cache memory addressability.

BACKGROUND OF THE INVENTION

In modern "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

One such large mass storage subsystem is described in, for example, U.S. Pat. No. 5,206,939, entitled System And Method For Disk Mapping And Data Retrieval, issued Apr. 27, 1993 to Moshe Yanai, et al (hereinafter, "the '939 patent"), and U.S. Pat. No. 5,381,539, entitled "System And Method For Dynamically Controlling Cache Management," issued Jan. 10, 1995, to Moshe Yanai, et al., both of which are assigned to the assignee of the present invention and incorporated herein by reference. That patent and those applications generally describe an arrangement which allows data, as used by computers, organized in records, with each record being in well-known "CKD" ("count-key-data") format, to be stored in storage devices which provide a "fixed block" storage architecture. In this arrangement, a large cache is used to buffer data that is transferred from the storage devices for use by the respective computers, and, if the data has been modified, transferred back from to the storage devices for storage.

In the systems described in the aforementioned patent and patent applications, a directory table is used to provide information concerning the data that is stored in the mass storage subsystem. In one embodiment, in which the mass storage subsystem stores data on a number disk storage devices, the table includes information concerning selected characteristics of each of the CKD records stored in the mass storage subsystem, organized by device, cylinder and read/write head or track, and includes such information as record size and certain formatting characteristics.

As disk storage devices increase in storage capacity, it is desirable to increase the size of the cache, the size of the memory that is available for the directory table, and so forth. If these elements are not increased, the cache may become a bottleneck to performance of the mass storage subsystem. A problem arises, however, in that typically, the word size that is used by many processing devices and systems is on the order of thirty-two bits, which would limit addressing of the memory used for the cache, directory table and so forth to four gigabytes (232 bytes).

SUMMARY OF THE INVENTION

The invention provides a new and improved mass digital data storage subsystem that includes an arrangement for increasing cache memory addressability.

In brief summary, the invention provides a memory manager for use in connection with a memory, the memory manager comprising a memory access request receiver module, an address translation module and a memory access operation control module. The memory access request receiver module is configured to receive an access request requesting an access operation in connection with the memory, the access request including an address. The address translation module is configured to, (i) if the access request requests an access operation in connection with one of a plurality of sections of the memory, provide the address in the access request as an absolute address identifying at least one storage location in the one section; and (ii) if the access request requests an access operation in connection with another of said sections, generate an absolute address from the address provided in the access request, the address in the access request including a segment identifier and an offset, the address translation module being configured to process the segment identifier and offset to generate an absolute address identifying at least one storage location in the other of said sections.

The memory access operation control module is configured to perform an access operation in connection with the memory using the absolute address generated by the address translation module.

In one embodiment, the memory manager is used in connection with a large memory that is divided into a plurality of sections. One of the sections is a common memory that can be accessed by a number of elements using an absolute address. Another of the sections is in the form of a cache memory divided into a plurality of cache slots, with each cache slot having a plurality of storage locations. In an access request that requests access to a storage location in a cache slot, the segment identifier identifies the cache slot and the offset identifies the storage location in the cache slot that is to be accessed. In that embodiment, the memory manager generates an absolute address by shifting the bits comprising the cache slot identifier to higher-order bit positions and adding the offset thereto. This allows for addressing of larger cache memories.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
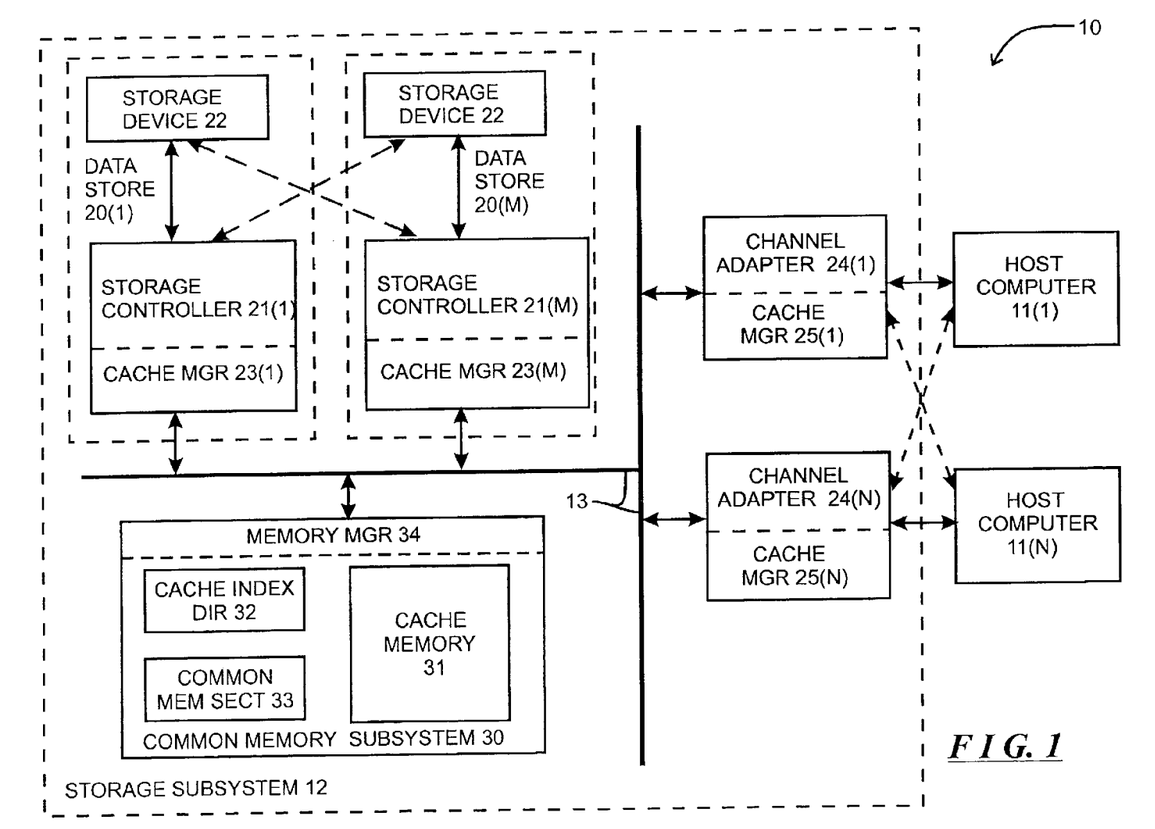
FIG. 1 is a functional block diagram of a digital computer system, including a mass storage subsystem that includes an arrangement for increasing cache memory addressability, constructed in accordance with the invention.

The invention will be described in connection with a digital computer system 10 depicted in functional block diagram form in FIG. 1. With reference to FIG. 1, computer system 10 includes a plurality of host computers 11(1) through 11(N) (generally identified by reference numeral 11(n)) and a digital data storage subsystem 12 interconnected by a common bus 13. Each host computer 11(n) may comprise, for example, a personal computer, workstation, or the like which may be used by a single operator, or a multi-user computer system which may be used by a number of operators. Each host computer 11(n) is connected to an associated channel adapter 24(n), which, in turn, is connected to bus 13. Each host computer 11(n) may control its associated channel adapter 24(n) to perform a retrieval operation, in which the channel adapter 24(n) initiates retrieval of computer programs and digital data (generally, "information") from the digital data storage subsystem 12 for use by the host computer 11(n) in its processing operations. In addition, the host computer 11(n) may control its associated channel adapter 24(n) to perform a storage operation in which the channel adapter 24(n) initiates storage of processed data in the digital data storage subsystem 12. Generally, retrieval operations and storage operations in connection with the digital data storage subsystem 12 will collectively be referred to as "access operations."

In connection with both retrieval and storage operations, the channel adapter 24(n) will transfer access operation command information, together with processed data to be stored during a storage operation, over the bus 13. Access to the bus 13 is controlled by bus access control circuitry which, in one embodiment, is integrated in the respective channel adapters 15(n). The bus access control circuitry arbitrates among devices connected to the bus 13 which require access to the bus 13. In controlling access to the bus 13, the bus access control circuitry may use any of a number of known bus access arbitration techniques.

The digital data storage subsystem 12 in one embodiment is generally similar to the digital data storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). As shown in FIG. 1, the digital data storage subsystem 12 includes a plurality of digital data stores 20(1) through 20(M) (generally identified by reference numeral 20(m)), each of which is also connected to bus 13. Each of the data stores 20(m) stores information, including programs and data, which may be accessed by the host computers 11(n) as well as processed data provided to the digital data storage subsystem 12 by the host computers 11(n).

Each data store 20(m), in turn, includes a storage controller 21(m) and one or more storage devices generally identified by reference numeral 22. The storage devices 22 may comprise any of the conventional magnetic disk and tape storage devices, as well as optical disk storage devices and CD-ROM devices from which information may be retrieved. Each storage controller 21(m) connects to bus 13 and controls the storage of information which it receives thereover in the storage devices connected thereto. In addition, each storage controller 21(m) controls the retrieval of information from the storage devices 22 which are connected thereto for transmission over bus 13, and in one embodiment includes bus access control circuitry for controlling access to bus 13.

The digital data storage subsystem 12 also includes a common memory subsystem 30 for caching information during an access operation and event status information providing selected status information concerning the status of the host computers 11(n) and the data stores 20(m) at certain points in their operations. The caching of event status information by the common memory subsystem 30 is described in detail in U.S. patent application Ser. No. 08/532,240, filed Sep. 25, 1995, in the name of Eli Shagam, et al., and entitled Digital Computer System Including Common Event Log For Logging Event Information Generated By A Plurality of Devices assigned to the assignee of the present invention and incorporated herein by reference. The information cached by the common memory subsystem 30 during an access operation includes data provided by a host computer 11(n) to be stored on a data store 20(m) during a storage operation, as well as data provided by a data store 20(m) to be retrieved by a host computer 11(n) during a retrieval operation. The common memory subsystem 30 effectively operates as a buffer to buffer information transferred between the host computers and the data stores 20(m) during an access operation.

The common memory subsystem 30 includes a cache memory 31, a cache index directory 32 and a common memory section 33, which are generally described in U.S. patent application Ser. No. 07/893,509 filed Jun. 4, 1995, in the name of Moshe Yanai, et al., entitled "System And Method For Dynamically Controlling Cache Management," assigned to the assignee of the present invention and incorporated herein by reference. The cache memory 31 operates as a buffer in connection with storage and retrieval operations, in particular buffering data received from the host computers 11(n) to be transferred to the storage devices for storage, and buffering data received from the data stores 20(m) to be transferred to the host computers 11(n) for processing.

The cache memory 31 and cache index directory 32 are generally similar to those described in U.S. patent application Ser. No. 09/378,644, filed Aug. 20, 1999, in the names of Natan Vishlitzky, et al., and entitled "Digital Data Storage Subsystem Including Directory For Efficiently Providing Formatting Information For Stored Records" (hereinafter the "Vishlitzky application"), incorporated by reference, and will not be described in detail herein. Generally, however, the cache memory 31 includes a series of storage locations, which are organized in a series of cache slots (not separately shown). The cache slots in turn, operate as the cache memory's buffer as noted above. The storage locations in each are identified by a series of addresses, with the starting address of a cache slot being identified by a base address. Each cache slot generally has the capacity to store an entire track of data from a storage device 22.

The cache index directory 32 operates as an index for the cache slots in the cache memory, and serves to associate 31. The cache index directory 32 includes a plurality of cache index tables (not separately shown) each of which is associated with one of the storage devices 22 in the storage subsystem 12. The structure of the cache index table associated with a storage device 22 is generally similar to that described in the "Vishlitzky application"), incorporated by reference, and will not be described in detail herein. Generally, each cache index table includes a plurality of cylinder descriptors, each of which is associated with one of the cylinders in the storage device 22 associated with the respective cache index table. Each cylinder descriptor, in turn, includes a plurality of track descriptors, each of which is associated with one of the tracks in the cylinder. Each track descriptor includes status information for the associated track, including a cached pointer and a cache slot pointer field. If data retrieved from a track, or to be stored in a track, is in a cache slot in the cache memory 31, the track descriptor associated with the track will include a set cached flag to so indicate and include a pointer to the cache slot that contains the data in the cache slot pointer field.

Each of the channel adapters and each of the device controllers 21(*m*) includes a cache manager 25(*n*) and 23(*m*), respectively, to access to the cache memory 31, cache index directory 32 and common memory section 33. The particular operations performed during an access operation will depend on a number of factors, including the access operation to be performed, whether or not the data from the particular track to be accessed is cached in the cache memory 31, and whether or not the data contained in a cache slot has been modified or updated by a channel adapters cache manager 25(*n*) during a storage operation. As described in the aforementioned Shagam application, the channel adapters 24(*n*) typically perform storage and retrieval operations in connection with data in the cache memory 31, and the device controllers 21(*m*) perform "staging" and "de-staging" operations to transfer data in the storage devices 22 to the cache memory 31 for buffering (the staging operations) and to transfer data from the cache memory 31 to the storage devices 22 for storage (the destaging operations). In performing the staging and de-staging operations, the device controllers 21(*m*) generally transfer data to and from the cache memory 31 in units of a track, that is, they will, during a staging operation, transfer all of the data in a track from a storage device 22 to a cache slot in the cache memory 31, and, during a de-staging operation, copy all of the data in a slot in the cache memory 31 to the track of the storage device 22 from which it was originally staged.

The common memory section 33 maintains a number of work lists which are used to control operations by the channel adapters 15(*n*) and storage controllers 21(*m*) during an access operation.

The common memory section 33 maintains a number of work lists which are used to control operations by the channel adapters 24(*n*) and storage controllers 21(*m*) during an access operation. In particular, the common memory section 33 includes a cache slot replacement list, a pending write list and various lists which the channel adapters 24(*n*) and storage controllers 21(*m*) use to communicate to coordinate staging operations (not shown). It will be appreciated that the various lists maintained by the common memory section 33 may comprise any of a number of convenient forms, including queues, trees, stacks or the like. The cache slot replacement list is used to control re-use of cache slots during staging operations in accordance with a convenient cache-slot re-use methodology. During a staging operation, the storage controllers cache manager 23(*m*) uses the cache slot replacement list to select a cache slot into which it will load the data retrieved from a storage device. (The aforementioned Shagam application describes a modified least-recently-used cache-slot re-use methodology used in one embodiment of the invention). The pending write list is used to identify cache slots which contain updated data, which has not been written to a storage device. During de-staging operations, the storage controllers controllers' cache managers 23(*m*) will use the write pending list to identify cache slots to be written to a storage device 22. Preferably, the cache slots which are identified in the pending write list will not also be listed in the cache slot replacement list, so that cache slots which contain updated data will not be used until the data has not been written to a storage device through a de-staging operation.

The staging operation coordination communication lists include a plurality of stage request lists and a plurality of stage completion lists, with one stage request list being associated with each data store 20(*m*) and one stage completion list being associated with each host computer 11(*n*). The channel adapters' cache managers 25(*n*) use the stage request lists to store stage requests to be performed by the respective data stores 20(*m*), and the data stores' cache managers 23(*n*) use the stage completion lists to store stage completion messages to indicate to the respective channel adapters' cache managers 25(*n*) that the stage requests have been completed.

Generally, a channel adapter 24(*n*), during a retrieval operation, attempts to retrieve the data from the cache memory 31. However, if the data is not in the cache memory 31, it will enable the device controller 21(*m*) which controls the storage device 22 that contains the data to be retrieved to "stage" the track which contains the data to be retrieved, that is, to transfer all of the data in the track which contains the data to be retrieved into a slot in the cache memory 31. After the data to be retrieved is in a slot in the cache memory 31, the channel adapter 24(*n*) will retrieve the data from the slot. Similarly, during a storage operation, the channel adapter 24(*n*) will determine whether the particular track into which the data is to be written is in a slot in the cache memory 31 and if so will store the data in the slot. However, if the data is not in the cache memory 31, the channel adapter 24(*n*) will enable the cache manager 23(*m*) and storage controller 21(*m*) which controls the storage device 22 that contains the track whose data is to be updated to perform a staging operation in connection with the track, thereby to transfer the data in the track into a slot in the cache memory 31. After the data from the track has been copied into the cache memory 31, the channel adapter 24(*n*) will update the data in the track.

The storage controller 21(*m*) generally attempts to perform a staging operation in connection with an empty slot in the cache memory 31. However, if the storage controller 21(*m*) may find that all of the cache slots in the cache memory 31 are filled, it will in any case select one of the slots to be used with the staging operation. Before transferring the data from the track to the selected cache slot, it will determine whether the data in the slot has been updated by a storage operation, and if so copy the data to the storage device 22 in a de-staging operation, and thereafter perform a staging operation to copy the data from the storage device to the selected cache slot. It will be appreciated that the storage controller 21(*m*) need only perform a de-staging operation in connection with a cache slot if the data in the cache slot has been updated, since if the data in the cache slot not been updated before the slot is re-used (which may occur if the channel adapter 24(*n*) has only performed retrieval operations therewith), the data in the cache slot corresponds to the data in the storage device 22.

More specifically, as described in the aforementioned Shagam application, during a retrieval operation, the cache manager of the initiating channel adapter 24(*n*) will initially access the cache index table 32(*d*) in the cache index directory 32 associated with the storage device 22 in which the data to be retrieved is stored, in particular accessing the track descriptor of the cylinder descriptor to determine, from the condition of the cached flag, whether the data from the track is cached in a cache slot in the cache memory. If the cached flag indicates that data from the track is cached in a cache slot the cache manager 25(*n*) uses the cache slot pointer to identify the particular cache slot in which the data is cached and retrieves the required data from the cache slot.

On the other hand, if the cache manager 16(*n*) determines from the cached flag that the data from the track is not cached in a cache slot, it will generate a stage request to enable the storage controller 21(*m*) for the storage device 22 which maintains the data to be retrieved, load the stage request in the stage request queue for the data store 21(*m*) and notify the storage controller 21(*m*) that a stage request had been loaded in the stage request queue. At some point after receiving the notification, the storage controller 21(*m*) will retrieve the stage request and perform a staging operation in response thereto. In performing the staging operation, the storage controller 21(*m*) will retrieve the data from the requested track, use the above-described cache slot replacement list to select a cache slot, load the data into cache slot and update the track descriptor in the cache index table associated with the storage device 22 to indicate that the data from the track is in the cache slot, in particular setting the cached flag and loading a pointer to the cache slot in the cache slot pointer.

After the storage controller 21(*m*) has completed the staging operation, it will load a staging completed message in the stage completion list in the common memory section 33 associated with the host computer 11(*n*) which issued the staging request, and notify the host computer cache manager 25(*n*) that a stage completed message has been loaded therein. At some point after receiving the notification, the host computers' cache manager 25(*n*) can repeat the operations performed in connection with the retrieval request as described above, in particular accessing the cache index table in the cache index directory 32 associated with the storage device 22 in which the data to be retrieved is stored, in particular accessing the track descriptor of the cylinder descriptor to determine, from the condition of the cached flag, whether the data from the track is cached in a cache slot in the cache memory and, if so, use the cache slot pointer to identify the particular cache slot in which the data is cached and retrieve the required data from the cache slot. Since at this point the cached flag should indicate that the data from the track is cached in a cache slot, the channel adapter's cache manager should be able to complete the retrieval operation.

Similar operations occur during a storage operation, in which data in a particular track is updated with the additional operation of removing the identification of the cache slot containing data to be updated from the replacement list and loading it into the pending write list. During a storage operation, the cache manager 25(*n*) of the initiating channel adapter 24(*n*) will initially access the cache index table in the cache index directory 32 associated with the storage device 22 in which the data to be updated is stored, in particular accessing the track descriptor of the cylinder descriptor to determine, from the condition of the cached flag, whether the data from the track is cached in a cache slot in the cache memory. If the cached flag indicates that data from the track is cached in a cache slot, the cache manager 25(*n*) uses the cache slot pointer to identify the particular cache slot in which the data is cached and loads the update data into the cache slot. In addition, the channel adapter's cache manager will remove the identification of the selected cache slot from the replacement list to the pending write list so that the cache slot will not be re used until a de-staging operation has been performed in connection with the cache slot.

On the other hand, if the cache manager 25(*n*) determines from the cached flag that the data from the track is not cached in a cache slot, it will generate a stage request to enable the storage controller 21(*m*) for the storage device 22 which maintains the data to be retrieved, load the stage request in the stage request queue for the data store 21(*m*) and notify the storage controller 21(*m*) that a stage request had been loaded in the stage request queue. At some point after receiving the notification, the storage controller 21(*m*) will retrieve the stage request and perform a staging operation in response thereto. In performing the staging operation, the storage controller 21(*m*) will retrieve the data from the requested track, select a cache slot, load the data into cache slot and update the track descriptor in the cache index table associated with the storage device 22 to indicate that the data from the track is in the cache slot, in particular setting the cached flag and loading a pointer to the cache slot in the cache slot pointer.

After the storage controller 21(*m*) has completed the staging operation, it will load a staging completed message in the stage completion queue in the common memory section 33 associated with the host computer 11(*n*) which issued the staging request, and notify the cache manager 25(*n*) that a stage completed message has been loaded therein. At some point after receiving the notification, the cache manager 25(*n*) can repeat the operations performed in connection with the retrieval request as described above, in particular accessing the cache index table in the cache index directory 32 associated with the storage device 22 in which the data to be retrieved is stored, in particular accessing the track descriptor of the cylinder descriptor to determine, from the condition of the cached flag, whether the data from the track is cached in a cache slot in the cache memory and, if so, use the cache slot pointer to identify the particular cache slot in which the data is cached and retrieve the required data from the cache slog. Since at this point the cached flag should indicate that the data from the track is cached in a cache slot, the cache manager should be able to complete the storage operation as described above.

As described above, the data stores' cache managers 23(*m*) also perform destaging operations using the pending write list to identify cache slots which contain updated data to be written back to the original storage device 22 and track whose data was cached in the respective cache slots. When a cache slot is de-staged, since at that point the data in the cache slot corresponds to the data on the respective storage device 22, the data stores cache manager 23(*m*) which performs the de-staging operation will remove the cache slots identification from the pending write list and return it to the replacement list so that the cache slot can be removed. It will be appreciated, however, that a host computer's cache manager 25(*n*) may perform a number of retrieval operations and/or storage operations in connection with data in the same cache slot after the data in the track cached in the slot has been staged and before it can be de-staged, and so data in a cache slot can be updated a number of times before it is de-staged. In addition, it will be appreciated that after a cache slot has been de-staged, it may also be updated during a storage operation before the cache slot is re-used during a staging operation. When that occurs however, since, as described above, the host computer's cache manager 25(*n*) removes the cache slot's identification from the replacement list and placed it on the write pending list as part of the storage operation, the cache slot will be subject to another de-staging operation before it can be re-used. Thus, a particular cache slot may be subject to de-staging a number of times with data cached for the same storage device 22, cylinder and track, without being reused.

In addition to the work lists, the common memory section 33 may provide storage for other data, including, for example the aforementioned event log, status information, and other information that may be useful in connection with the operation and maintenance of the storage subsystem 12.

The invention provides an arrangement for efficiently addressing the common memory subsystem 30. In one embodiment, the various portions of the common memory subsystem 30, namely, the cache memory 31, the cache index directory 32 and the common memory section 33, reside in a commonly-addressable random-access memory. When a cache manager 23(*m*), 25(*n*) accesses the common memory section 33, it will generally do so by providing a "linear" address, that is a single address that generally identifies the storage location continuing the data to be retrieved during a retrieval operation, or in which data is to be stored during a storage operation.

On the other hand, when a cache manager 23(*m*), 25(*n*) accesses the cache memory 31 or the cache index directory 32, it will generally do so by providing a "segmented" address. That is, when a cache manager 23(*m*), 25(*n*) accesses the cache memory 31, it will provide a cache slot pointer and an offset. The cache slot pointer identifies the particular cache slot in the cache memory 31 that includes the storage location from which data is to be retrieved during a retrieval operation, or in which data is to be stored during a storage operation. The offset, in turn, identifies the offset, from, for example, the first storage location in the cache slot, which is identified by the base address for the cache slot, to the particular storage location in which data is to be stored or from which data is to be retrieved.

Similarly, when a cache manager 23(*m*), 25(*n*) accesses the cache index directory 32, it will provide a device pointer and an offset. The device pointer identifies the particular one of the storage devices 22 whose cache index table is to be accessed, and the offset provides an offset from the beginning of the cache index table to the particular storage location in which data is to be stored during a storage operation, or from which data is to be retrieved during a retrieval operation.

The common memory subsystem 30 also includes a memory manager 34 that performs a number of operations in connection with the invention. In particular, the memory manager 34 receives storage and retrieval requests from the cache managers 23(*m*), 25(*n*). If a request is to store data in, or retrieve data from, a storage location in the common memory section 33, it will make use of the address provided in the request in performing the storage or retrieval operation. In addition, the memory manager 34 may validate the address to verify that the address is within the region of memory for the common memory section 33.

On the other hand, if the request is to store data in, or retrieve data from, a storage location in the cache memory 31, the memory manager 34 will generate from the cache slot pointer and offset a linear address that can be used in addressing the cache memory 31. In addition, the memory manager 34 will validate the cache slot pointer to verify that it points to a valid cache slot, and the offset to verify that it points to a valid storage location within the cache slot. In validating the offset, the memory manager 34 can determine whether the value of the offset is larger than the number of storage locations in the cache slot. Generally, all of the cache slots will contain the same number of storage locations, and the memory manager 34 can compare the value of the offset to a value that corresponds to the number of storage locations in a cache slot. If the value of the offset is greater than the number of storage locations in a cache slot, the memory manager 34 will determine that the offset is invalid. On the other hand, if the value of the offset is less than or equal to the number of storage locations in a cache slot, the memory manager 34 will determine that the offset is valid. Similarly, in validating the cache slot pointer, the memory manager 34 can compare the value represented by the cache slot pointer to the number of cache slots. If the value represented by the cache slot pointer is greater than the number of cache slots in the cache memory 31, the memory manager 34 will determine that the cache slot pointer is invalid. On the other hand, if the value represented by the cache slot pointer is less than or equal to the number of cache slots, the memory manager 34 will determine that the cache slot pointer is valid.

On the other hand, if the request is to store data in, or retrieve data from, a storage location in the cache index directory 32, the memory manager 34 will generate from the device pointer and offset a linear address that can be used in addressing the cache memory 31. In addition, the memory manager 34 will validate the device pointer to verify that it points to a valid storage device, and the offset to verify that it points to a valid storage location within the storage device's cache index table. In validating the offset, the memory manager 34 can determine whether the value of the offset is larger than the number of storage locations in the cache index table. Generally, all of the cache index tables will contain the same number of storage locations, and the memory manager 34 can compare the value of the offset to a value that corresponds to the number of storage locations in a cache index table. If the value of the offset is greater than the number of storage locations in a cache index table, the memory manager 34 will determine that the offset is invalid. On the other hand, if the value of the offset is less than or equal to the number of storage locations in a cache index table, the memory manager 34 will determine that the offset is valid. Similarly, in validating the device pointer, the memory manager 34 can compare the value represented by the device pointer to the number of storage devices. If the value represented by the device pointer is greater than the number of storage devices 22 in the data stores 20(*m*), the memory manager 34 will determine that the device pointer is invalid. On the other hand, if the value represented by the device pointer is less than or equal to the number of storage devices 22, the memory manager 34 will determine that the device pointer is valid.

In one embodiment, the memory manager 34 generates a linear address from a cache slot pointer and offset, during a storage or retrieval operation in connection with a cache slot, in the same manner that it generates a linear address from the device pointer and offset, during a storage or retrieval operation in connection with a cache index table. Generally, after validating the respective cache slot pointer or device pointer and the offset, the memory manager 34 generates the linear address by shifting the binary representation of the pointer "to the left", by a predetermined number "n" of bit positions, so that the "i-th" bit of the pointer is shifted to the "i+n-th" bit position. If the number of bits in the respective pointer is "I," and bit positions in the respective pointer are labeled I-1 (which corresponds to the left-most, most significant bit position), through "0" (which corresponds to the right-most, least significant bit position), bits in the "n" left-most bit positions I-1 through I-1-*n* of the pointer will be shifted out of the shifted pointer, and bits having selected values, for example "zero's," will be shifted into the "n" right-most bit positions 0 through n-1. After the pointer has been shifted to the left, the offset will be added to the shifted pointer to generate the linear address.

In one embodiment, the number "n" of bit positions that the respective cache slot pointer or device pointer will be shifted is selected to be "seven." Providing a shift of seven allows the number of addressable storage locations that can be addressed to be increased by $2^7$, or 128. Accordingly, if a cache manager 23(*m*), 25(*n*) were to provide a storage or retrieval request to the memory manager 34 that included a thirty-two bit linear address, which could identify a storage location in a common memory subsystem 30 that comprises a 4 GB (four gigabyte) memory, by instead having the cache manager 23(m), 25(n) provide a pointer and offset and having the memory manager 34 generate a linear address by shifting the cache slot/device pointer by seven bit positions and adding the offset thereto will allow the identification of a storage location in a common memory subsystem 30 that comprises a 512 GB memory.

Figure 2:
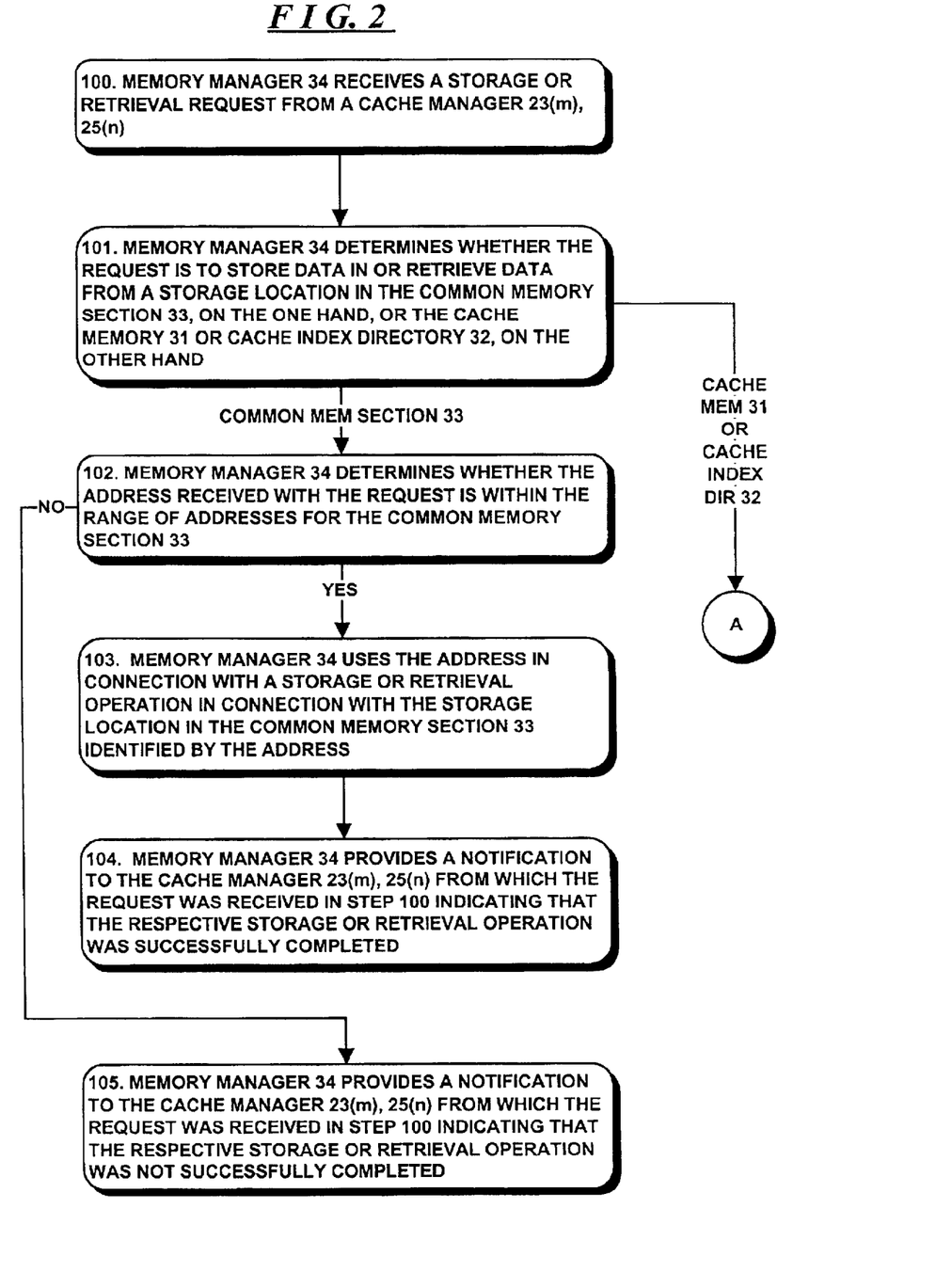
FIG. 2 is a flow chart depicting operations performed by the mass storage subsystem in connection with the invention.
Figure 2A:
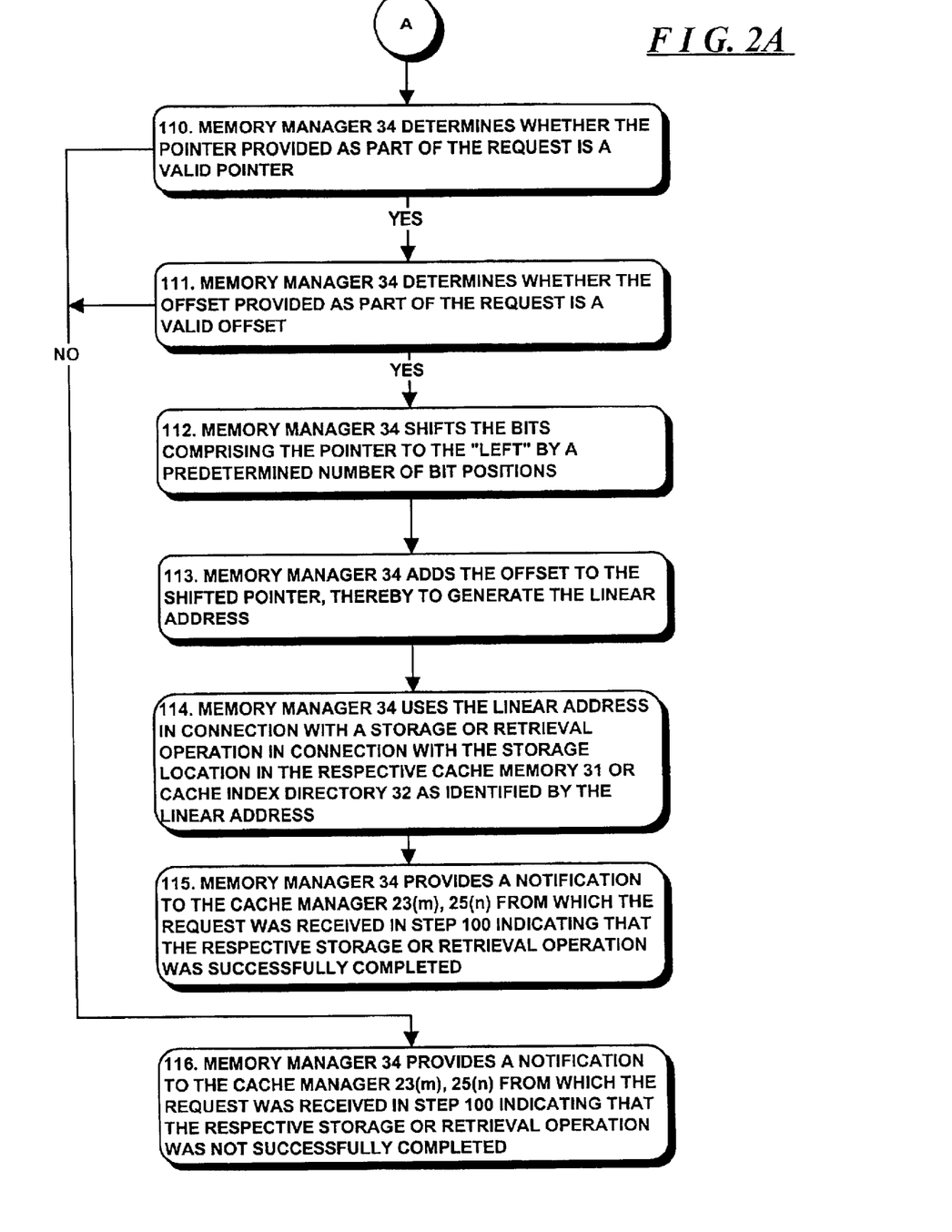

Operations performed by the memory manager 34 in connection with a retrieval or storage request from a cache manager 23(m), 25(n) will be described in connection with the flow chart depicted in FIG. 2. With reference to FIG. 2, after the memory manager 34 receives a storage or retrieval request from a cache manager 23(m), 25(n) (step 100), it will initially determine whether the request is to store data in or retrieve data from a storage location in the common memory section 33, on the one hand, or the cache memory 31 or cache index directory 32, on the other hand (step 101). The memory manager 34 can determine in step 101 that the request is to store data in or retrieve data from a storage location in the common memory section 33 if, for example the request includes a single, for example thirty-two bit address, which it can then determine to be a linear address. On the other hand, the memory manager 34 can determine in step 101 that the request is to store data in or retrieve data from the cache memory 31 or cache index directory 32 if, for example, the request includes two addresses, one of which it can determine to be a cache slot or device pointer and the other an offset.

If the memory manager 34 determines in step 101 that the request is to store data in or retrieve data from a storage location in the common memory section 33, it will sequence to a step 102 in which it will determine whether the address received with the request is within the range of addresses for the common memory section 33. If the memory manager 34 makes a positive determination in step 102, it will use the address in connection with a storage or retrieval operation in connection with the storage location in the common memory section 33 identified by the address (step 103). Thereafter, the memory manager 34 can provide a notification to the cache manager 23(m), 25(n) from which the request was received in step 100 indicating that the respective storage or retrieval operation was successfully completed (step 104).

Returning to step 102, if the memory manager 34 makes a negative determination in that step, it will sequence to step 105, in which it will provide a notification to the cache manager 23(m), 25(n) from which the request was received in step 100 indicating that the respective storage or retrieval operation was not successfully completed. Thereafter, the cache manager 23(m), 25(n) may perform predetermined error recovery operations.

Returning to step 101, if the memory manager 34 determines in that step that the request is to store data in or retrieve data from a storage location in the cache memory 31 or the cache index directory 32, it will sequence to a step 110 in which it will determine whether the pointer provided as part of the request is a valid pointer (step 110). It will be appreciated that, if the request is to store data in or retrieve data from a storage location in the cache memory 31, the memory manager 34 will determine whether the pointer is valid by determining whether it points to a valid cache slot. On the other hand, if the request is to store data in or retrieve data from the cache index directory 32, the memory manager 34 will determine whether the pointer is valid by determining whether it points to a valid storage device 22.

In either case, if the memory manager 34 makes a positive determination in step 110, which will be the case if the pointer provided as part of the request points to a valid cache slot or cache index table, it will sequence to step 111 to determine whether the offset provided as part of the request is a valid offset. It will be appreciated that, if the request is to store data in or retrieve data from a storage location in the cache memory 31, the memory manager 34 will determine whether the offset is valid by determining whether the value of the offset is less than the number of storage locations in a cache slot. On the other hand, if the request is to store data in or retrieve data from the cache slot directory 32, the memory manager 34 will determine whether the pointer is valid by determining whether the value of the offset is less than the number of storage locations in a cache index table in the cache index directory 32.

If the memory manager 34 makes a positive determination in step 111, which will be the case if the offset provided as part of the request is a valid offset, it will sequence to a series of steps to generate a linear address using the pointer and offset. In that operation, the memory manager 34 will shift the bits comprising the pointer to the "left" by a predetermined number of bit positions (step 112), and add the offset to the shifted pointer, thereby to generate the linear address (step 113). After the memory manager 34 has generated the linear address, it will use the linear address in connection with a storage or retrieval operation in connection with the storage location in the respective cache memory 31 or cache index directory 32 as identified by the address (step 114). Thereafter, the memory manager 34 can provide a notification to the cache manager 23(m), 25(n) from which the request was received in step 100 indicating that the respective storage or retrieval operation was successfully completed (step 115).

Returning to steps 110 and 111, if the memory manager 34 makes a negative determination in either step, it will sequence to step 105, in which it will provide a notification to the cache manager 23(m), 25(n) from which the request was received in step 100 indicating that the respective storage or retrieval operation was not successfully completed (step 116). It will be appreciated that the memory manager 34 will make a negative determination in step 10 if it determines that the pointer provided as part of the request does not identify a valid cache slot or storage device 22. After the cache manager 23(m), 25(n) receives the notification, it may perform predetermined error recovery operations.

The invention provides a number of advantages. In particular, the invention provides an arrangement that allows for the addressing of a random-access memory, such as the common memory subsystem 30 having increased numbers of storage locations.

It will be appreciated that a number of modifications may be made to the digital data storage subsystem as described above in connection with FIGS. 1 and 2. For example, although the storage subsystem 12 has been described as being connected to a plurality of host computers 11(n), it will be appreciated that the storage subsystem may be used only in connection with a single host computer 11(n). In addition, although the storage subsystem 12 has been described as including a plurality of data stores 20(m) and a plurality of storage devices 22, it will be appreciated that the storage subsystem 12 may be provided with a single data store and a single storage device.

Furthermore, it will be appreciated that, although the memory manager 34 has been described as directly using the pointer provided with the access request in generating an absolute address, it will be appreciated that the memory manager 34 may instead use the pointer provided with the access request as an index into a table. The table, in turn, has a plurality of entries, each of which is associated with one of the values of the pointers that may be provided with an access request and contains a value that, when shifted by the selected number of bit positions, provides the base address for the cache slot or directory table in the common memory subsystem. This will alleviate having the devices that generate the access requests to be provided with such information.

In addition, it will be appreciated that the number "n" of bit positions that the respective pointer is shifted may differ from "seven," and may comprise any convenient value.

It will be appreciated that a system in accordance with the invention can be constructed in whole or in part from special purpose hardware or a general purpose computer system, or any combination thereof, any portion of which may be controlled by a suitable program.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the united states is:

1. A memory manager for use in connection with a memory, the memory manager comprising:
   A. a memory access request receiver module configured to receive an access request requesting an access operation in connection with the memory, the access request including an address;
   B. an address translation module configured to,
      (i) if the access request requests an access operation in connection with one of a plurality of sections of the memory, provide the address in the access request as an absolute address identifying at least one storage location in the one section; and
      (ii) if the access request requests an access operation in connection with another of said sections, generate an absolute address from the address provided in the access request, the address in the access request including a segment identifier and an offset, the address translation module being configured to process the segment identifier and offset to generate an absolute address identifying at least one storage location in the other of said sections; and
   C. a memory access operation control module configured to perform an access operation in connection with the memory using the absolute address generated by the address translation module.

2. A memory manager as defined in claim 1 in which each of the segment identifier and offset comprises a plurality of digits arranged in respective ones of a plurality of digit positions, the address translation module being configured to, if the access request requests an access operation in connection with said another of said sections, generate the absolute address by shifting the digits comprising the segment identifier to higher-order digit positions thereby to provide a shifted segment identifier, and adding the offset to the shifted segment identifier.

3. A memory manager as defined in claim 1 in which the segment identifier identifies a segment in said another of said sections, the segment comprising a selected number of storage locations, the address translation module being further configured to perform a verification operation in connection with the offset to verify that the offset identifies a storage location in the segment identified by the segment identifier.

4. A memory manager as defined in claim 3 in which said another of said sections operates as a cache memory, at least one of said segments comprising a cache slot.

5. A memory manager as defined in claim 4 in which the memory further comprises yet another section for which, if the access request requests an access operation in connection therewith, the address translation module is configured to generate an absolute address from the address provided in the access request, the address in the access request including a segment identifier and an offset, the address translation module being configured to process the segment identifier and offset to generate an absolute address identifying at least one storage location in the yet another of said sections, the yet another section comprising a directory for the cache memory.

6. A memory management method for use in managing a memory, the memory management method comprising the steps of:
   A. receiving an access request requesting an access operation in connection with the memory, the access request including an address;
   B. an address translation step in which,
      (i) if the access request requests an access operation in connection with one of a plurality of sections of the memory, the address in the access request is provided as an absolute address identifying at least one storage location in the one section; and
      (ii) if the access request requests an access operation in connection with another of said sections, an absolute address is generated from the address provided in the access request, the address in the access request including a segment identifier and an offset, the address translation module being configured to process the segment identifier and offset to generate an absolute address identifying at least one storage location in the other of said sections; and
   C. memory access operation control step in which an access operation is performed in connection with the memory using the absolute address generated during the address translation step.

7. A memory management method as defined in claim 6 in which each of the segment identifier and offset comprises a plurality of digits arranged in respective ones of a plurality of digit positions, the address translation step including the step of, if the access request requests an access operation in connection with said another of said sections, generating the absolute address by shifting the digits comprising the segment identifier to higher-order digit positions thereby to provide a shifted segment identifier, and adding the offset to the shifted segment identifier.

8. A memory management method as defined in claim 6 in which the segment identifier identifies a segment in said another of said sections, the segment comprising a selected number of storage locations, the address translation step including the step of performing a verification operation in connection with the offset to verify that the offset identifies a storage location in the segment identified by the segment identifier.

9. A memory management method as defined in claim 8 in which said another of said sections operates as a cache memory, at least one of said segments comprising a cache slot.

10. A memory management method as defined in claim 9 in which the memory further comprises yet another section for which, if the access request requests an access operation in connection therewith, the address translation step includes the step of generating an absolute address from the address provided in the access request, the address in the access request including a segment identifier and an offset, the address translation step including the step of processing the segment identifier and offset to generate an absolute address identifying at least one storage location in the yet another of said sections, the yet another section comprising a directory for the cache memory.

11. A computer program product for use in connection with a digital data processor to provide memory manager for use in connection with a memory, the computer program product comprising a machine readable medium having encoded thereon:

A. a memory access request receiver module configured to enable the processor to receive an access request requesting an access operation in connection with the memory, the access request including an address;

B. an address translation module configured to enable the processor to, (i) if the access request requests an access operation in connection with one of a plurality of sections of the memory, provide the address in the access request as an absolute address identifying at least one storage location in the one section; and (ii) if the access request requests an access operation in connection with another of said sections, generate an absolute address from the address provided in the access request, the address in the access request including a segment identifier and an offset, the address translation module being configured to enable the processor to process the segment identifier and offset to generate an absolute address identifying at least one storage location in the other of said sections; and C. a memory access operation control module configured to enable the processor to perform an access request in connection with the memory using the absolute address generated by the address translation module.

12. A computer program product as defined in claim 11 in which each of the segment identifier and offset comprises a plurality of digits arranged in respective ones of a plurality of digit positions, the address translation module being configured to enable the processor to, if the access request requests an access operation in connection with said another of said sections, generate the absolute address by shifting the digits comprising the segment identifier to higher-order digit positions thereby to provide a shifted segment identifier, and adding the offset to the shifted segment identifier.

13. A computer program product as defined in claim 11 in which the segment identifier identifies a segment in said another of said sections, the segment comprising a selected number of storage locations, the address translation module being further configured to enable the processor to perform a verification operation in connection with the offset to verify that the offset identifies a storage location in the segment identified by the segment identifier.

14. A computer program product as defined in claim 13 in which said another of said sections operates as a cache memory, at least one of said segments comprising a cache slot.

15. A computer program product as defined in claim 14 in which the memory further comprises yet another section for which, if the access request requests an access operation in connection therewith, the address translation module is configured to enable the processor to generate an absolute address from the address provided in the access request, the address in the access request including a segment identifier and an offset, the address translation module being configured to enable the processor to process the segment identifier and offset to generate an absolute address identifying at least one storage location in the yet another of said sections, the yet another section comprising a directory for the cache memory.

* * * * *